United States Patent [19]
Bowman

[11] 3,881,834
[45] May 6, 1975

[54] JOINT SEALS

[76] Inventor: Thomas C. Bowman, 49 Arkansas St., Buffalo, N.Y. 14213

[22] Filed: May 10, 1973

[21] Appl. No.: 359,140

Related U.S. Application Data

[63] Continuation of Ser. No. 171,157, Aug. 12, 1971, abandoned.

[30] Foreign Application Priority Data

Aug. 20, 1970 Australia.............................. 2263/70
Aug. 20, 1970 Australia.............................. 2264/70

[52] U.S. Cl. .................... 404/64; 277/205; 277/207
[51] Int. Cl. ............................................ E04c 11/10
[58] Field of Search ............ 404/64, 65, 67, 68, 49; 52/396, 403; 277/207, 205

[56] References Cited
UNITED STATES PATENTS
3,521,528  7/1970  Wangerow.......................... 277/207
3,608,442  9/1971  Berchou et al. ...................... 404/65

*Primary Examiner*—Robert I. Smith
*Attorney, Agent, or Firm*—Ashlan F. Harlan, Jr.

[57] ABSTRACT

A flexible, resilient, hollow, elastomeric sealing strip for use in highway joints or the like which comprises an internal, reinforcing network of webs designed to provide controlled foldability of the reinforcing webs, controlled stress during lateral compression, and vertical stability and having a top wall the center of which, under lateral compression of the strip, moves downwardly.

2 Claims, 7 Drawing Figures

PATENTED MAY 6 1975 3,881,834

INVENTOR.
THOMAS C. BOWMAN
BY
*Asalan O. Harlan Jr.*
ATTORNEY

INVENTOR.
THOMAS C. BOWMAN
BY
Ashlan F Harlan Jr
ATTORNEY

JOINT SEALS

This is a continuation of application Ser. No. 171,157, filed Aug. 12, 1971, and now abandoned.

BACKGROUND OF THE INVENTION

The present invention relates to sealing members and is particularly concerned with preformed, flexible, elastomeric sealing members or strips for insertion in expansion joints.

In the construction of highways and bridges where large concrete slabs are used, it has been found that joints must be provided at spaced intervals to allow for the expansion and contraction of the structure that take place with varying temperature conditions and/or with shifting of the slabs, and thus prevent buckling or cracking. Expansion joints of substantial width, e.g. 2 in. or more, are usually provided in pavements on and at the approaches to bridges and similar joints may be formed at points in a highway. Such joints may be formed as spaces or slots left between adjoining pavement sections or as slots cut transversely through the pavement at intervals along its length. The slots, however formed, must be sealed to prevent accumulation therein of dirt, pebbles, or other incompressible solids which would interfere with their function and also to prevent the infiltration of water, which in freezing during cold weather, may cause damage to the abutting pavement sections.

There has been a growing tendency to employ preformed, compressible, elastomeric sealing members or strips to seal expansion joints since such strips have in substantially all cases advantages over the asphalt or caulking compound type of sealant widely used previously. However, with many designs of preformed seals there is a tendency for the sealing strip to rotate or shift in use, thus at least partially pulling away from one or the other of the adjacent faces of the pavements sections. In other known preformed sealing strips, internal reinforcing webs are so designed as to fold or bulge excessively when the strip is compressed in use. With such seals, after a long period of maximum compression, such as a prolonged spell of very hot weather, the webs have sometimes taken a permanent set whereby the resilience of the strip is so impaired that proper sealing is not achieved.

SUMMARY OF THE INVENTION

The present invention provides flexible, resilient, elastomeric sealing members or strips that are hollow and have an external configuration and an internal, reinforcing network of webs so designed as to obtain controlled foldability of the reinforcing webs, controlled stress during lateral compression, and vertical stability, i.e. resistance to rotation. These desirable characteristics are produced by forming the top wall of the sealing member or strip so that under lateral compression of the sealing member the center of the top wall moves downwardly and the wall folds inwardly. The reinforcing network of webs within the sealing strip comprises webs which exert force against the side walls to resist lateral compression of the strip and webs which control the folding of the top wall as such compression occurs. Sealing strips according to the present invention are most conveniently and cheaply produced by extrusion of a suitable elastomeric material such as rubber or neoprene so that the walls and web network are integral.

DESCRIPTION OF THE INVENTION

Figure 7:
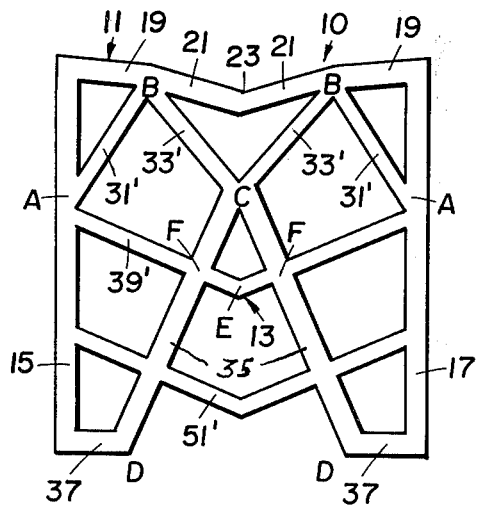
FIG. 7 is an end view similar to FIG. 6 of a still further modification.

The hollow sealing strip comprehensively designated 10 illustrated in FIGS. 1 - 4, inclusive, comprises a top wall 11, a bottom wall 13, and side walls 15 and 17. The top wall 11 comprises a pair of outer or edge portions 19, each one being integral with one of the side walls and extending inwardly, and a pair of inner portions 21, integrally joined at their inner ends and each being integral at its outer end with one of the outer portions 19. The outer portions 19 are substantially flat and may be normal to the side walls 15 and 17 or may, as shown in FIG. 7, be inclined slightly downwardly from their junctures with the side walls. The inner portions 21 of the top wall 11 slope downwardly toward the center to form a V-shaped trough 23. The bottom wall 13 will be further described hereinafter.

At this point it should be clearly understood that, as used herein, the terms "top," "bottom," "side," "right," "left," "up," "down," and similar terms of position, direction or relationship refer to the illustrations in the accompanying drawings, but are used only for convenience in reference and ease in description. Accordingly, such terms should not be construed so as to imply that any specific positioning of the struction or portions thereof is necessary or otherwise to limit the scope of the present invention.

The side walls 15 and 17 are substantially straight and parallel and are respectively joined at their upper and lower extremities to the top wall 11 and bottom wall 13. The outer faces of the walls 15 and 17 are preferably, as shown, formed with serrations 25 for reasons discussed hereinafter. The walls 11 and 13 are symmetrical with respect to a longitudinally extending plane passing through the strip parallel to and midway between the side walls 15 and 17.

Within the strip 10, as mentioned above, is a network of reinforcing webs preferably integrally joined together and with the walls of the strip. Comprised in this network are a pair of webs 31 each extending inwardly and upwardly from one of the side walls at a point intermediate the ends thereof, indicated by "A" to a point indicated by "B." The points B are at approximately the junctures between the adjacent portions 19 and 21 of the top wall 11. From each of said points B a web 33 extends downwardly and inwardly, said webs joining at a point indicated by "C" approximately midway between the walls 15 and 17. From point C webs 35 extend downwardly and outwardly and the lower ends thereof are respectively joined at points indicated by "D" to short, supporting webs 37. The latter are connected, respectively, to the lower ends of side walls 15 and 17 and extend inwardly substantially normal to the side walls.

Further reinforcement and stability is achieved by the provision of a V-shaped web 39, the ends of which are connected to the side walls 15 and 17 at the points A and with its apex indicated at "E" located substantially midway between the side walls and somewhat above the webs 37. The supporting webs 37 are reinforced, so that as hereinafter described they will adequately support the sealing strip on metal flanges provided on the adjacent ends of the pavement sections forming the joint, with short webs 41 that extend, respectively, from the points C at the inner ends of the webs 41 to points on the side walls 15 and 17 above the lower ends thereof. The V-shaped web 39 intersects the webs 35 at points indicated by "F."

It will be seen from the foregoing that the bottom wall 13 of the strip 10 is irregular in profile since it comprises the webs 37, the lower portions of webs 35 from the points D to the points F, and the bottom portion of V-shaped web 39 from the points F to the point E.

Figure 3:
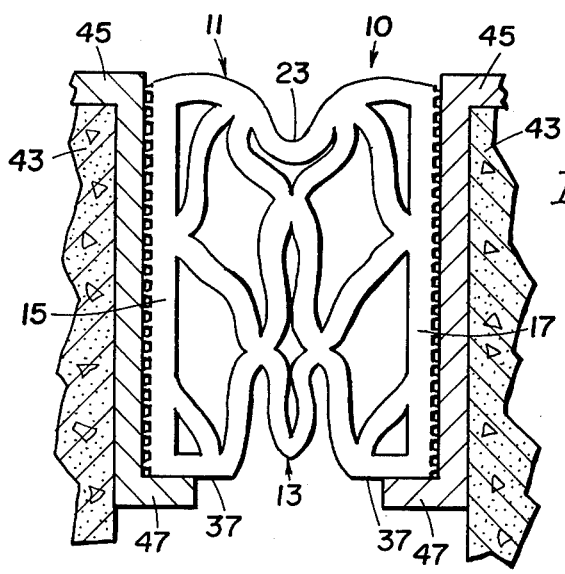
FIG. 3 is an end view of the sealing strip shown in FIG. 1 in place as a compression seal between two pavement sections and under slight compression therein.

In FIG. 3 the sealing strip 10 is shown mounted between two pavement sections 43, the adjacent ends of which are provided with steel or other suitable metal projection plates 45 having inwardly projecting flanges 47 at the bottom edges thereof. As will be seen, the supporting side webs 37 of the strip 10 are seated on the flanges 47. The latter are so located that the top wall of the sealing strip during use is at all times below the pavement surface. In installing a sealing strip according to the invention, it is almost essential to apply a lubricant to the sides of the compressed strip before forcing it into the joint or opening between the pavement sections. Since it has been found that difficulties with ejection of seals as well as with improper sealing are reduced or obviated by adhesively securing the side walls of the sealing strip to the adjacent pavement sections, the lubricant composition employed is usually also a suitable adhesive which forms a strong, lasting bond between the strip and the adjacent pavement surfaces. A number of such adhesive-lubricant compositions are commercially available.

It has been found that when using such adhesive-lubricant compositions the provision of longitudinally extending serrations, such as shown at 25, on the side walls of the sealing strip is advantageous. Not only do serrations provide mechanical locking action but also considerably more suface area is available for adhesive bonding to contacting areas when serrations are used. Moreover, the linear reservoirs formed in the serrated surface tend to retain the lubricant-adhesive and thus distribute it over the faces where needed. Without serrations there is, of course, a tendency to wipe the adhesive from the strip. It will be understood that the shape, size, and spacing of the serrations may vary, depending on the sizes of the sealing strip, the type of contacting pavement surface, and other factors. For example, instead of being blunt as shown,, the serrations can be rounded, sharp or otherwise as desired.

Figure 4:
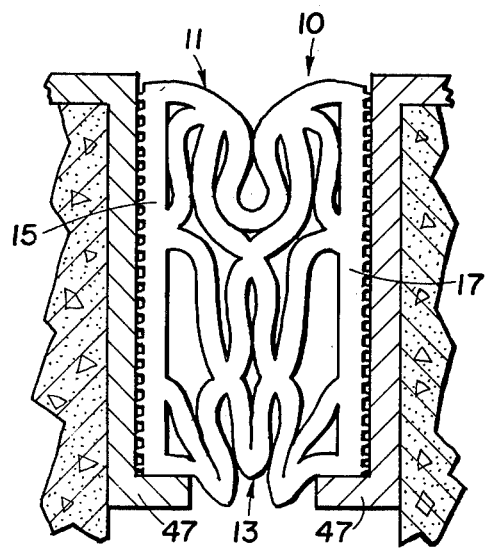
FIG. 4 is a view similar to FIG. 3 showing the sealing strip further compressed.

Referring again to FIG. 3, the sealing strip 10 is shown laterally compressed about 25 percent, i.e. the degree of compression present at low temperatures. In FIG. 4, the seal is represented as compressed about 55 percent, such compression being of the order encountered in use when the pavement is heated in hot weather. It will, however, be understood that in installing the sealing strips the amount of compression required will depend on the particular temperature conditions at the time as well as the width of the joints and the width of the strips.

As will be evident from the drawings, the reinforcing network of webs in sealing strip 10 bend and fold as the strip is compressed by lateral force applied thereto. The webs not only resist such compression, but also, through their connections to the side walls 15 and 17, supply pressure thereto whereby to maintain the sealing strip in position and the joint adequately sealed.

Figure 1:
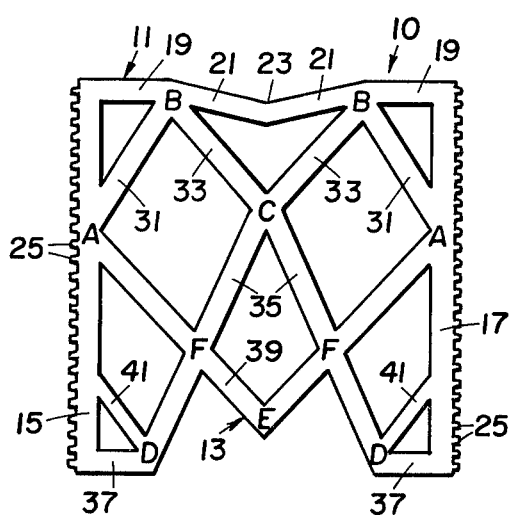
FIG. 1 is an end view of a sealing member or strip according to the present invention.
Figure 2:
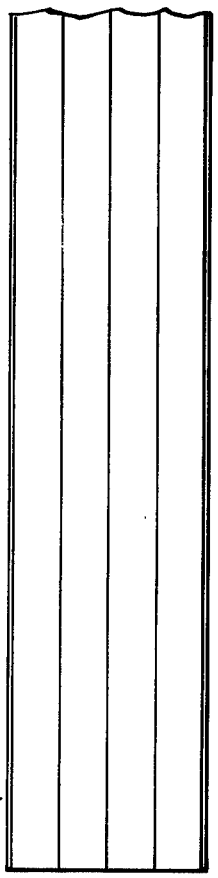
FIG. 2 is a fragmentary plan view of a sealing strip, such as shown in FIG. 1, according to the invention.
Figure 5:
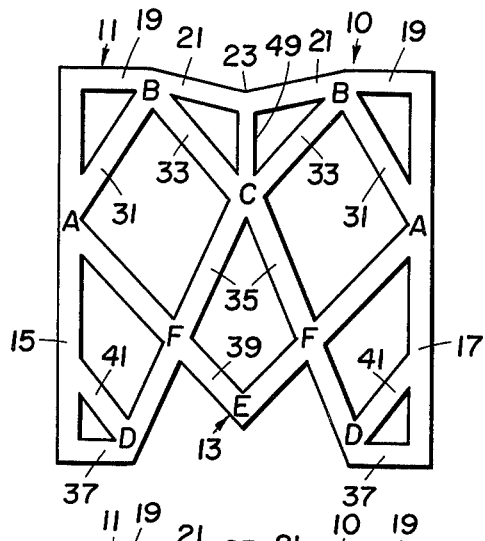
FIG. 5 is an end view similar to FIG. 1 of a modification.

In FIG. 5 there is illustrated a modification of the sealing strip shown in FIG. 1. The essential difference is the provision in the form shown in FIG. 5 of a central vertical web 49 extending upwardly from the point C at the juncture of the webs 33 and 35 to the center of the trough 23 formed by inner portions 21 of top wall 11. The web 49 serves, when used, to provide additional resistance to the inward folding of the portions 21 and thereby tends to increase the stability of the sealing strip.

Figure 6:
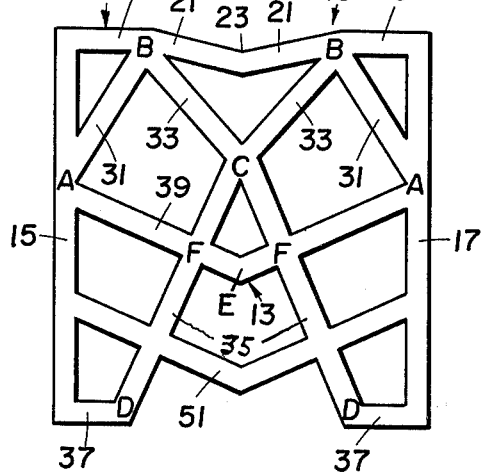
FIG. 6 is an end view similar to FIG. 1 of another modification.

FIG. 6 illustrates another modification of the sealing strip structure shown in FIG. 1. This modification, while shown as incorporated in a sealing strip which is approximately as high as it is wide, is particularly applicable to sealing strips that have a height to width ratio greater than 1, i.e. with the side walls greater in length than the width of the strip. In the modified form of sealing strip the V-shaped web 39 is formed with a wider angle than in FIG. 1 so that its apex is raised in position, a second V-shaped web 51 is provided below the web 39, and the lower diagonal webs 41 are eliminated. The web 51, the legs of which are substantially parallel to the legs of the web 39, is like the latter attached at its ends to the side wals 15 and 17 intermediate their ends with its apex being substantially midway between the side walls and somewhat above the webs 37. Consequently, the bottom wall 13 of the strip illustrated in FIG. 6 comprises the webs 37, the lower portions of webs 35 and the bottom portion of the V-shaped web 51. The location of the web 51 is such that the upper end portions thereof supply bracing for the bottom wall and the webs 41 are hence unnecessary.

FIG. 7 illustrates a modification of the seal shown in FIG. 6 in which certain of the internal webs are thinner than the top and side walls and the main diagonal webs. To distinguish them, the thinner webs have been designated by the same reference numerals as the corresponding thicker webs in FIG. 6, but with primes affixed.

It will be seen that in the modifications shown in FIGS. 6 and 7, the reinforcing web network has been changed so that the resisting lateral compression of the sealing strip is applied more evenly on the side walls of the strips. This is particularly important when the height to width ratio of the strip is greater than 1. Changing the thickness of certain of the webs as illustrated in FIG. 7 provides a convenient way to modify or adjust the force required for obtaining a specific degree of sealing strip compression. Although in FIGS. 6 and 7, as well as in FIG. 5, the seals are illustrated without longitudinal, parallel serrations on the exterior of the side walls, it will be understood that such serrations can be formed thereon if desired. As pointed out above, the use of serrations is desirable in many cases.

The modified sealing members shown in FIGS. 5, 6 and 7 are installed and used in the same way as the form shown in FIG. 1.

Since it is desired in most cases to form strips in long lengths, often as long as 60 feet, in order to minimize the number of splices or longitudinal joints required, the sealing strips of the present invention are preferably produced by extrusion. Thus, the outer walls and the interior webs are extruded together and constitute an integral, longitudinally extending hollow body. Although any extrudable, flexible, elastomeric material can be used in forming strips, it is generally preferred to employ neoprene and particularly neoprene compositions that are characterized by low crystallization values at low temperatures. Obviously, however, the material is a matter of choice, dependent upon the conditions to which the sealing strip will be exposed, and a flexible, resilient elastomeric material suitable for maintaining a good seal under such conditions should be chosen.

It will be apparent that sealing strips according to the present invention may be made in a wide variety of sizes for accommodation in different sized joints and that the thickness of the outer walls and reinforcing internal webs may vary in accordance with the size of the strips and the ratio of compressive force to lateral compression of the strip which is desired. A matter of importance, however, is that the angle between the webs 33 should be larger than the angle between the webs 35. This ensures a better distribution of force from the point C to the top wall 11 of the sealing strips. Also important to note is that, with the described construction, when the strip is compressed the portions 19 of the top wall adjacent the side walls tend to roll upwardly (see FIG. 2), thereby providing additional pressure against the sides of the joint at the upper ends of the side walls.

It will be apparent that sealing strips according to the present invention are so reinforced as to be stable and maintain a good seal. Further, their structure, as described, permits lower stresses in the sealing strips with consequent longer life.

Sealing strips or members according to the invention, may of course, be used not only in bridge expansion joints, but in other expansion or contraction joints in pavements and the like as well as between other concrete, masonry, or metal structural units, e.g. stone building blocks. In such use, they may be inserted in joints in direct contact with the concrete pavement slabs or with the structural units, or they may be used with metal or other suitable surfaces interposed in such joints. Accordingly, the invention should not be construed as being limited to use with the structure shown and described, and, as pointed out above, the sealing strips themselves may be varied to a considerable extent without departing from the spirit of the invention.

I claim:

1. An elongated, flexible, resilient, hollow sealing member for sealing an expansion or contraction joint comprising: a pair of spaced, substantially parallel side walls, a top wall, a bottom wall, and an internal network of reinforcing webs, said walls and network being integral; said top wall being joined to said side walls and having adjacent its ends plural straight, continuous, inwardly extending portions substantially normal to said side walls and downwardly sloping central portions connected to the inner ends of said straight portions and forming a single, central trough; said internal network including (1) a first V-shaped web terminating at its respective ends in said side walls intermediate the ends thereof and substantially below the junction of said side wall with said top wall and extending downwardly with the apex of said V located midway between said side walls and above the lower ends of said side walls, (2) a pair of outwardly diverging webs extending downwardly from a junction located midway between said side walls and between said apex and said top wall and intersecting said first V-shaped web, and (3) a pair of outwardly diverging webs extending upwardly from said junction and connected to said top wall between said trough and said side walls; and said bottom wall comprising (1) a pair of supporting webs, each connected to one of said side walls at the lower ends of the latter, each of said supporting webs extending inwardly at right angles from said side walls to a junction with one of said downwardly and outwardly extending webs, (2) the portions of said downwardly and outwardly extending webs below their intersections with said first V-shaped web, and (3) the portion of said first V-shaped web lying between the intersections thereof with said downwardly and outwardly extending webs; there being no vertical web tying together the junction of said downwardly and outwardly extending webs and said first V-shaped web.

2. A sealing member as set forth in claim 1 in which there is provided a second V-shaped reinforcing web terminating at its respective ends in said side walls intermediate the ends of said walls at points above the junctures of said first V-shaped web with said side walls, said second V-shaped web being wholly within said member.

* * * * *

UNITED STATES PATENT OFFICE
CERTIFICATE OF CORRECTION

PATENT NO. : 3881834
DATED : May 6, 1975
INVENTOR(S) : Thomas C. Bowman

It is certified that error appears in the above-identified patent and that said Letters Patent are hereby corrected as shown below:

Column 1, line 39, "pavements" has been changed to -- pavement --.

Column 3, line 18, "C" has been changed to -- D --.

Signed and Sealed this thirtieth Day of September 1975

[SEAL]

Attest:

RUTH C. MASON
Attesting Officer

C. MARSHALL DANN
Commissioner of Patents and Trademarks